United States Patent
Chang et al.

(10) Patent No.: US 9,428,072 B2
(45) Date of Patent: Aug. 30, 2016

(54) METHOD AND SYSTEM FOR EXTENDING BATTERY LIFE

(71) Applicant: Ford Global Technologies, LLC, Dearborn, MI (US)

(72) Inventors: Xiaoguang Chang, Northville, MI (US); Josephine S. Lee, Novi, MI (US); Xu Wang, Dearborn, MI (US); Chuan He, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 14/150,986

(22) Filed: Jan. 9, 2014

(65) Prior Publication Data

US 2015/0191098 A1    Jul. 9, 2015

(51) Int. Cl.
*B60L 11/18*    (2006.01)

(52) U.S. Cl.
CPC ........ *B60L 11/1861* (2013.01); *B60L 11/1857* (2013.01); *B60L 11/1862* (2013.01); *B60L 2260/22* (2013.01); *Y02T 10/7005* (2013.01)

(58) Field of Classification Search
USPC ....... 701/34.4, 418; 320/104, 116, 118, 132, 320/134; 324/430
See application file for complete search history.

(56) References Cited

U.S. PATENT DOCUMENTS

| | | | |
|---|---|---|---|
| 2009/0139781 A1 | 6/2009 | Straubel | |
| 2011/0264390 A1 | 10/2011 | Shabra | |
| 2012/0046795 A1 | 2/2012 | Kelly | |
| 2013/0027048 A1* | 1/2013 | Schwarz | H01M 10/44 324/427 |
| 2013/0221916 A1 | 8/2013 | Kelty et al. | |
| 2013/0221928 A1* | 8/2013 | Kelty et al. | 320/134 |
| 2014/0152315 A1* | 6/2014 | LePort et al. | 324/430 |
| 2014/0375545 A1* | 12/2014 | Ackerman et al. | 345/156 |

* cited by examiner

*Primary Examiner* — Jelani Smith
(74) *Attorney, Agent, or Firm* — Carlson, Gaskey & Olds, P.C.

(57) ABSTRACT

A method for extending the life cycle of a battery includes receiving a storage mode status signal at a battery controller and incrementally adjusting a state of charge window over a period of time in response to receiving the storage mode status signal.

16 Claims, 4 Drawing Sheets

METHOD AND SYSTEM FOR EXTENDING BATTERY LIFE

BACKGROUND

The present disclosure relates generally to electrified vehicles, and more specifically to extending a lifecycle of a battery for use in the same.

Generally, electrified vehicles differ from conventional motor vehicles because electric and hybrid-electric vehicles are selectively driven using one or more battery powered electric machines. In contrast, conventional motor vehicles rely exclusively on an internal combustion engine to drive the vehicle. Electrified vehicles may use electric machines in addition to, or in place of, the internal combustion engine.

Example electrified vehicles include hybrid electric vehicles (HEVs), plug-in hybrid electric vehicles (PHEVs), and battery electric vehicles (BEVs). A primary component common to all electrified vehicles is the battery pack. The battery pack contains multiple battery cells that store electrical power for powering the electric machine. The battery cells may be charged prior to use, and are recharged during driving by a regeneration brake or engine. As a result of this functionality, the battery type selected for use in an electric or hybrid electric vehicle must be suitable for frequent charging and discharging.

One such suitable battery type is a lithium-ion battery. As lithium-ion batteries age, they lose capacity and increase internal resistance, which limits the effective lifespan. Keeping the battery in less than ideal conditions for extended periods without using the battery can accelerate the loss of capacity and the increment of internal resistance. The ideal extended storage conditions of a lithium-ion battery are different from the ideal standard operating conditions of an electrified vehicle.

SUMMARY

A method for extending the life cycle of a battery according to an exemplary embodiment of this disclosure, among other possible things includes incrementally adjusting a state of charge window over a predefined time period in response to receiving the storage mode status signal.

In a further embodiment of the foregoing method, the state of charge window is defined by a state of charge maximum limit, a state of charge high limit, a state of charge low limit and a state of charge minimum limit.

A further embodiment of the foregoing method includes the step of operating vehicle electronic systems using power from the battery, thereby reducing a charge level of the battery until the battery is within the state of charge window defined between the state of charge low limit value and the state of charge high limit value.

A further embodiment of the foregoing method includes the step of outputting a signal indicative of the battery system controller fully entering a storage mode in response to the state of charge low limit value reaching a storage state of charge low limit value and the state of charge high limit value reaching a storage state of charge high limit value, and battery state of charge (or charge level) is within the storage state of charge low limit and the storage state of charge high limit.

A further embodiment of the foregoing method includes the steps of receiving a storage mode status signal at a battery system controller, and the battery energy system controller periodically polling a driver input.

In a further embodiment of the foregoing method, the steps of receiving a storage mode status signal at a battery system controller, incrementally adjusting the state of charge window defined by, the state of charge maximum limit, the state of charge high limit and the state of charge low limit over the predefined time period in response to receiving the storage mode status signal are performed during operation of a vehicle containing the battery.

In a further embodiment of the foregoing method, the step of receiving a storage mode status signal at a battery system controller includes receiving an expected duration of the storage mode.

A further embodiment of the foregoing method, includes resetting the state of charge low limit to a non-storage low limit value, resetting the state of charge high limit to a non-storage high limit value, and resetting the state of charge maximum limit to a non-storage maximum limit value in response to the duration of the storage mode being exceeded.

A further embodiment of the foregoing method includes the step of charging the battery system in response to the duration of the storage mode being exceeded.

A further embodiment of the foregoing method, further includes the step of reducing a charge power limit of the battery system and adjusting a discharge power limit of the battery system to a predefined value after the step of incrementally adjusting the state of charge window defined by the state of charge maximum limit, the state of charge high limit and the state of charge low limit over the predefined time period in response to receiving the storage mode status signal.

A further embodiment of the foregoing method, further includes the step of exiting a storage mode in response to receiving a remote signal.

In a further embodiment of the foregoing method, the battery is a lithium-ion battery.

A vehicle battery system controller according to an exemplary embodiment of this disclosure, among other possible things non-transitory computer readable medium storing instructions operable to cause the battery system controller to perform the steps of, incrementally adjusting a state of charge window over a predefined time period in response to receiving the storage mode status signal.

In a further embodiment of the foregoing vehicle battery system controller, the operator input includes at least one of a touch screen button, a physical button, a toggle, and a remote input connection.

In a further embodiment of the foregoing vehicle battery system controller, the operator input further includes a duration input operable to receive a duration of a storage mode.

A further embodiment of the foregoing vehicle battery system controller includes a remote input.

In a further embodiment of the foregoing vehicle battery system controller, the remote input is a wireless receiver.

In a further embodiment of the foregoing vehicle battery system controller, the state of charge window is defined by a state of charge maximum limit, a state of charge high limit, a state of charge low limit, and a state of charge minimum limit.

A method for operating an electrified vehicle according to an exemplary embodiment of this disclosure, among other possible things includes receiving a storage mode status signal from a vehicle operator at a battery energy control module, and gradually adjusting a state of charge low limit from a first state of charge low limit value to a second state of charge low limit value, gradually adjusting a state of charge high limit from a first state of charge high limit value to a second state of charge high limit value, and gradually adjusting a state of charge maximum limit from a first state of charge maximum limit value to a second state of charge maximum limit value.

In a further embodiment of the foregoing method, the step of gradually adjusting a state of charge low limit from the first state of charge low limit value to the second state of charge low limit value, gradually adjusting the state of charge high limit from the first state of charge high limit value to the second state of charge high limit value, and gradually adjusting the state of charge maximum limit from the first state of charge maximum limit value to the second state of charge maximum limit value comprises periodically decrementing the state of charge low limit value by a set amount, periodically decrementing the state of charge high limit value by a set amount, and periodically decrementing the state of charge maximum limit value by a set amount over a predefined time period.

In a further embodiment of the foregoing vehicle battery system, a battery, and a controller operable to incrementally adjust a state of charge window over a predefined time period in response to a storage mode status signal.

The foregoing features and elements may be combined in any combination without exclusivity, unless expressly indicated otherwise.

BRIEF DESCRIPTION OF THE DRAWINGS

These and other features of the present invention can be best understood from the following specification and drawings, the following of which is a brief description.

DETAILED DESCRIPTION OF AN EMBODIMENT

Figure 1:
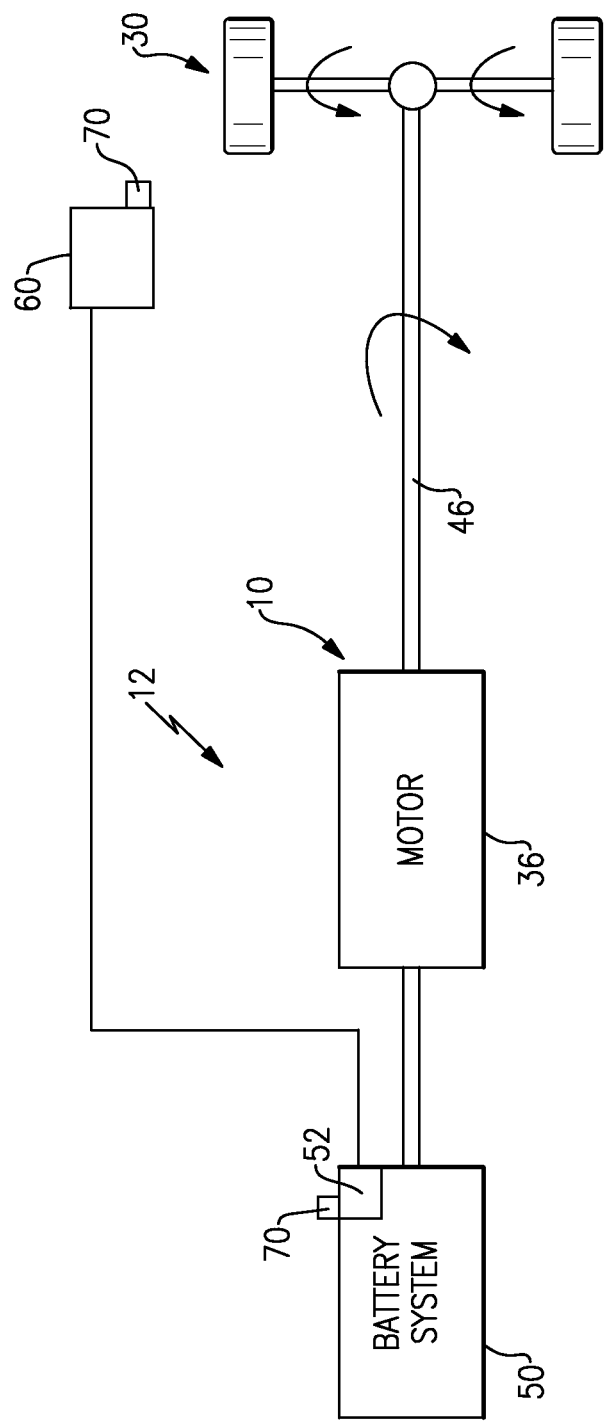
FIG. 1 schematically illustrates an example electric vehicle powertrain.

FIG. 1 schematically illustrates a powertrain 10 of an electrified vehicle 12. The electrified vehicle 12 may be a HEV, PHEV, BEV, or any other vehicle. In other words, this disclosure is not limited to any particular type of electrified vehicle.

The powertrain 10 includes a drive system having at least a motor 36 (i.e., an electric machine) and a battery system 50. The battery system 50 includes a high voltage lithium-ion battery that is capable of outputting electric power to operate the motor 36. Although not shown, the battery system 50 may be constructed of multiple smaller battery modules electrically connected to form the battery system 50. In some examples, the multiple smaller battery modules are contained in a single battery packaging, and in other examples the multiple smaller battery modules are contained in two or more independent battery packages that are electrically connected.

The battery system 50 is controlled by a battery system controller 52. The battery system controller 52 can be packaged integrally to the battery system 50, or separately from the battery system 50 and electrically coupled to the battery system 50. In alternate examples, the battery system controller 52 can be a module within a general engine controller 60.

The general engine controller 60 in this example, controls operations of the motor 36, as well as receives and interprets vehicle operator inputs. By way of example, the general engine controller 60 can be connected to an input system accessible by an operator of the vehicle 12 and the input system can include multiple touch screen buttons or physical buttons. The operator of the vehicle 12 can provide inputs to the general engine controller 60 by pushing or touching the buttons corresponding to a desired input. One such example input is a storage mode input that alerts the general engine controller 60 that after the current trip, the vehicle 12 will not be utilized for an extended period of time. This notification allows the general engine controller 60 to place various vehicle systems in a storage mode. In some examples, either the battery system controller 52, the general engine controller 60, or both can include a wireless/cellular wireless receiver 70 capable of receiving inputs from a remote source.

During operation, the drive system can generate torque to drive one or more sets of vehicle drive wheels 30 of the electrified vehicle 12. For example, the motor 36 can be powered by the battery system 50 and employed to electrically drive the vehicle drive wheels 30 by outputting torque to a shaft 46. The illustrated example of FIG. 1 is highly schematic. It should be appreciated that other components, including, but not limited to, an internal combustion engine, a generator, a power transfer unit, and one or more control systems, could also be included in the powertrain 10 of the electrified vehicle 12.

Lithium-ion batteries, such as the battery included in the battery system 50, typically have good charge/discharge characteristics during operation of the vehicle. However, when the battery is being stored the battery is maintained at a constant state of charge, and the ideal operating conditions vary from the ideal storage conditions.

Figure 2:
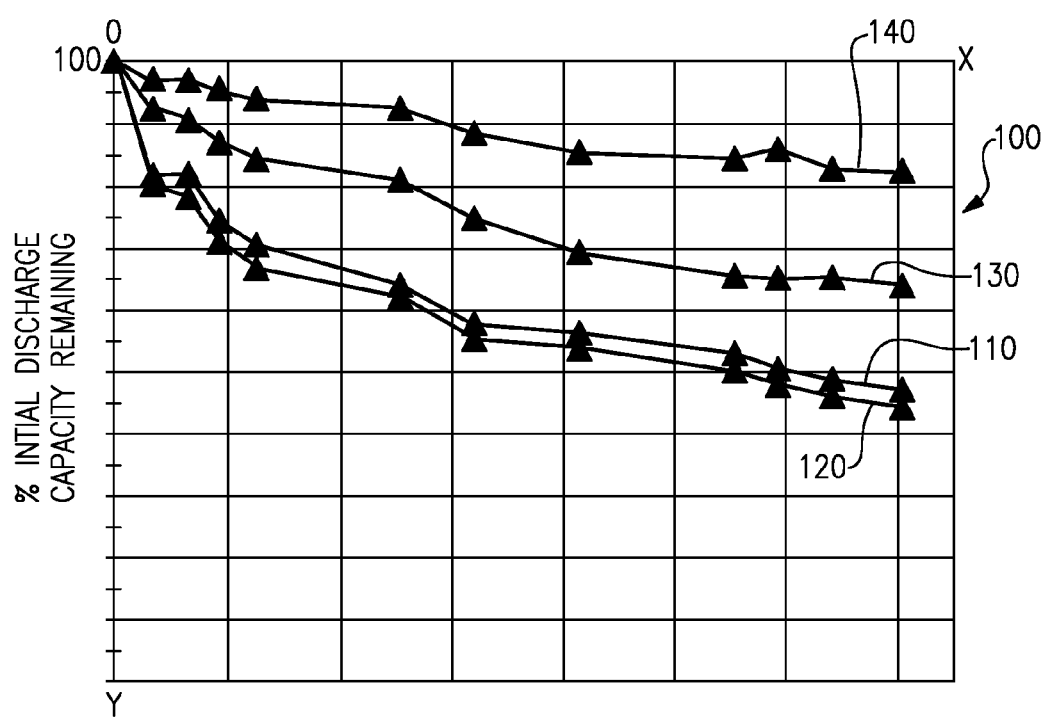
FIG. 2 illustrates a chart of battery capacity over time of an example lithium ion battery.

With continued reference to FIG. 1, FIG. 2 illustrates a chart 100 demonstrating the decline in percent of initial discharge capacity of a battery during storage at multiple initial state of charge levels. The Y axis indicates the percentage of initial discharge capacity remaining (referred to elsewhere as the "charge capacity" of the battery). The X axis indicates time. Each of the lines 110, 120, 130, 140 corresponds to a different initial state of charge with 110 being the highest, 120 being the second highest, 130 being the second lowest and 140 being the lowest. As can be seen, in each case the charge capacity remaining decreases over time as the battery is being stored.

The decrease over time of the two highest initial state of charge plots 110, 120 is approximately equal. However, as a general principle, the smaller the initial state of charge, the smaller the loss in charge capacity over time. This relationship is evidenced in the state of charge plots 130, 140 for the lower initial state of charge. The percentage internal resistance of the battery over time is also affected by the initial state of charge. Similarly, the percentage internal resistance increases more, and at a faster rate, when the initial state of charge of the battery is larger and when the battery is stored at a higher temperature.

Even further still, one of skill in the art will recognize that the higher the temperature that the battery is stored, the more exacerbated the above described effect will be. As a result, the ideal storage conditions are at a relatively low state of charge and a relatively low temperature. It will be understood, however, by one of skill in the art that the battery should be maintained at least at a minimum state of charge level in order to facilitate initial startup of the vehicle when the storage period has ended. It will further be recognized by one of skill in the art that the storage temperature is frequently difficult to control.

With the above described relationship in mind, it is advantageous to place the battery system 50 into a storage mode, when the operator of the vehicle 12 does not expect to utilize the vehicle 12 again for an extended period of time.

Figure 3:
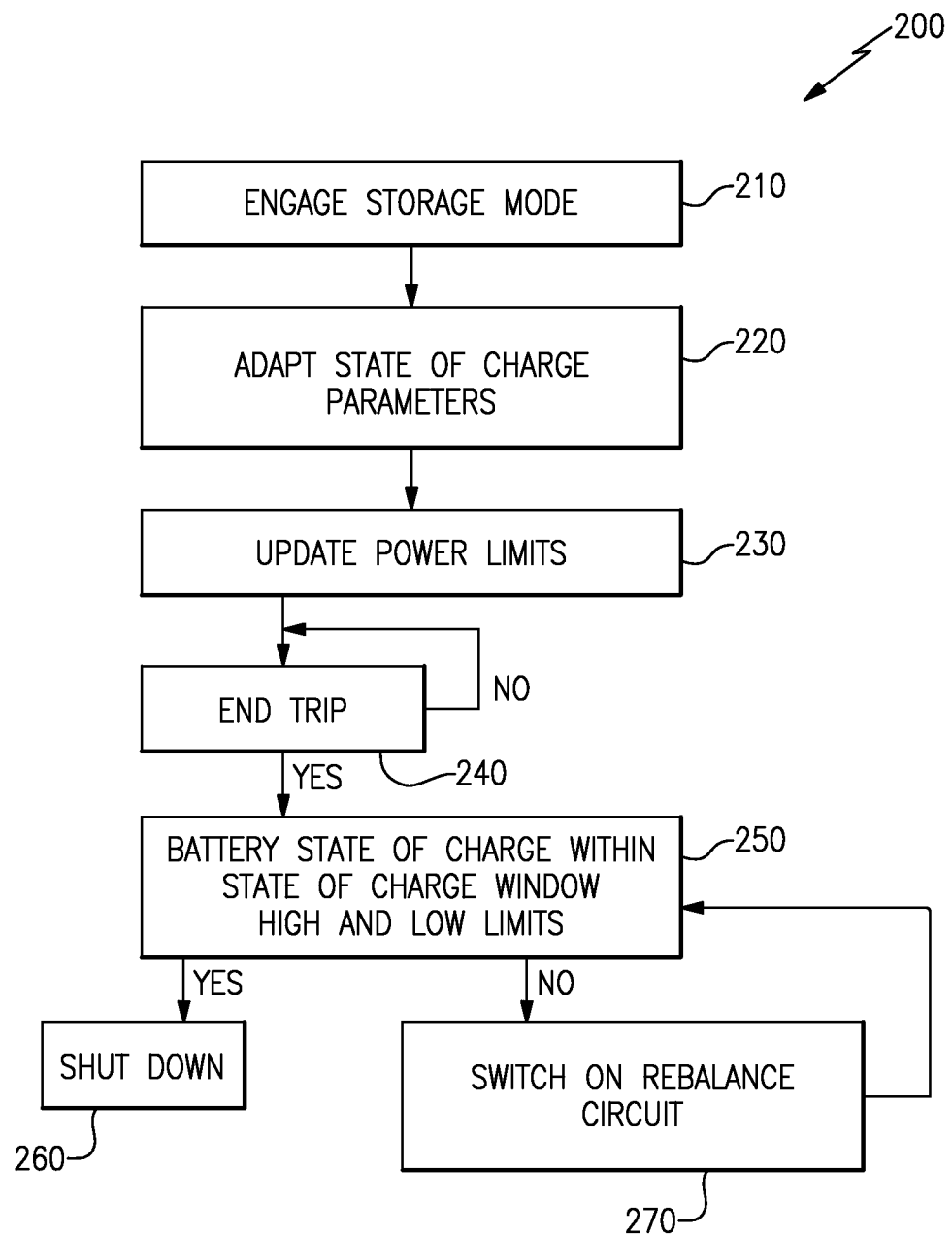
FIG. 3 illustrates a process by which an electric or hybrid electric vehicle is placed in a storage mode.

With continued reference to FIGS. 1 and 2, FIG. 3 illustrates a process of placing the battery system 50 into a storage mode. In the initial "Engage Storage Mode" step 210, the operator of the vehicle enters an input to the general engine controller 60 indicating that the vehicle will be inactive for an extended period following the conclusion of the current trip. This input can be performed via a touch-screen prompt, physical button, or any other standard input type. In one exemplary embodiment, the input is provided to the general engine controller 60. During standard operations, the battery system controller 52 periodically polls the general engine controller 60 to determine the mode of the vehicle 12 and receives the storage mode signal at this time. In an alternate example, the input is provided directly to the battery system controller 52 and polling is unnecessary.

When the battery system controller 52 receives a storage mode status signal from the general engine controller 60 indicating that the vehicle 12 is entering the storage mode, the battery system controller 52 begins adapting battery control parameters to align with storage mode parameters of the battery in an "Adapt State of Charge Parameters" step 220.

The primary battery control parameters, in this example, are a state of charge minimum limit, a state of charge low limit, a state of charge high limit, and a state of charge maximum limit. The state of charge limits define the desired level of charge for the battery system 50, as well as defining the absolute minimum and absolute maximum amount of charge that are allowed to be held by the battery. The state of charge minimum limit is set by the battery system controller 52 during manufacturing and is set to a level of charge sufficient to start the vehicle 12. When entering the storage mode, the state of charge minimum limit is not adjusted because a minimum amount of charge should be preserved in the battery in order to facilitate engine startup after the extended storage.

The state of charge maximum limit is a maximum amount of charge that the battery system controller 52 allows the battery to have at any time. The state of charge low limit is a charge level that is higher than the minimum limit and defines a lower boundary of a desired charge level of the battery system. Similarly, the state of charge high limit is a charge level that is lower than the state of charge maximum limit and defines an upper boundary of the desired charge level of the battery system 50. The window bounded on the low end by the state of charge low limit and on the high end by the state of charge high limit is referred to as the state of charge window.

When entering the storage mode, the state of charge low limit, high limit, and maximum limit are reduced in order to reduce the amount of charge held by the battery at the start of the extended storage. By reducing the amount of charge held by the battery, the decrease in charge capacity as a result of extended storage (see FIG. 2) is reduced. In one example, the limits are reduced downward to an extent necessary to ensure that 0.5*(Low_Lim+High_Lim) is approximately equal to a calibrate value, where Low_Lim represents the state of charge low limit and High Lim represents the state of charge high limit. As the battery ages, the battery capacity will decrease and internal resistance will increase. In order to guarantee the battery pack has enough energy and power for vehicle start, the calibrate value is determined based on the age of the battery system 50, with an older age corresponding with a higher calibrate value. The battery self-discharge characteristic is also considered when the calibration is designed. The calibrate value is a target, or optimal, state of charge for the battery system 50 at the start of the extended storage. One of skill in the art having the benefit of this disclosure can determine an appropriate calibration value based on the particular details of a given system. During the course of adjustment, the following relationships are maintained: maximum limit>high limit>low limit>minimum limit.

When entering the storage mode, the distances between maximum limit and high limit (i.e., maximum limit–high limit), high limit and low limit (i.e. high limit–low limit), low limit and minimum limit (i.e. low limit–minimum limit) shrink to calibratable values, which are determined based on battery capacity and charge and discharge power capabilities. The distances are calibrated to be big enough to provide the minimal energy and power required to drive vehicle.

As the storage mode can be entered into during operation of the vehicle, and abrupt changes to the storage parameters of the battery can impact vehicle performance, the battery system controller 52 gradually adjusts the parameters to the storage mode levels over aset period of time. The gradual adjustment of the parameters slows the impact of the adjustment on the operation of the vehicle and creates a safer transition to the storage mode. If the storage mode is entered when vehicle is not in use, the battery system controller 52 can adjust the parameters to the storage mode levels immediately.

By way of example, the period of time and the rate of adjustment can be defined by the battery system controller 52 such that the adjustment of the parameters is no greater than 5% per second. While described and exemplified herein as a linear adjustment, it should be understood that the adjustment of the parameters does not necessarily follow a linear path. In some examples the adjustment is incremented by a defined amount, producing the linear adjustment, and decreased the limit value to a set value over a predefined period of time. In other examples the limit values can be incremented by a defined percentage, resulting in decreased limit values along a non-linear path over a predefined period of time.

The gradual adjustment of the state of charge levels (the battery parameters) is described in greater detail below, with regards to FIG. 4.

Once the state of charge levels have been adjusted, the battery system controller 52 updates the power limits in an "Update Power Limits" step 230. During the Update Power Limits step 230, the battery system controller 52 reduces the charge power limit and increases or keeps discharge power limits to a predefined value if the battery is capable. The predefined value is calibrated and determined based on the charge and discharge power capabilities of the battery system 50. The discharge power limits are reduced to another predefined value if the battery is not capable. This predefined value is also determined based on the discharge power capability of the battery system 50. The charge and discharge power capabilities can be estimated and typically change with battery age. As with the battery parameters, the charge power limit and discharge limit are adjusted gradually in order to increase the comfort and ease of operations of the vehicle operator.

In order to facilitate the reduction of the battery state of charge to be within the state of charge low limit and high limit, excess energy is dissipated by either normal vehicle driving or operating vehicle electronics such as a heating/cooling/defrosting system, a radio system, a lighting system or any other onboard electronic device. The operation of the electronics is performed in conjunction with decreasing, or eliminating, the recharging current provided to the battery pack, thereby allowing the battery pack to discharge down to the predefined state of charge.

Once the parameters have been adjusted, and the power limits have been updated, the battery system 50 is ready to enter the storage mode upon shutdown, and the battery system controller 52 polls the system to determine if the vehicle 12 has been shut down in an "End Trip" step. Once the battery system controller 52 determines that the vehicle 12 has shut down, the battery system controller 52 checks to determine if the state of charge of the battery system 50 is within the storage mode state of charge high and low limits in a "Battery State of Charge Within State of Charge Limits Check" 250. If the state of charge of the battery system 50 is within the storage mode state of charge high and low limits, the battery system controller 52 disables all measurement circuitry and switches all rebalance circuitry off. Once this has occurred, the battery system 50 is ready for extended storage.

If the state of charge of the battery system 50 is not within the state of charge high and low limits, the battery system controller 52 switches on the rebalance circuitry of all cells within the battery system 50 in a "Switch on Rebalance Circuit" step 270. During the rebalancing, the battery system controller 52 periodically polls the state of charge of the battery system 50. When the state of charge falls within the state of charge window (the window bounded by the state of charge high limit and the state of charge low limit), the battery system controller 52 enters extended storage and shuts down.

Figure 4:
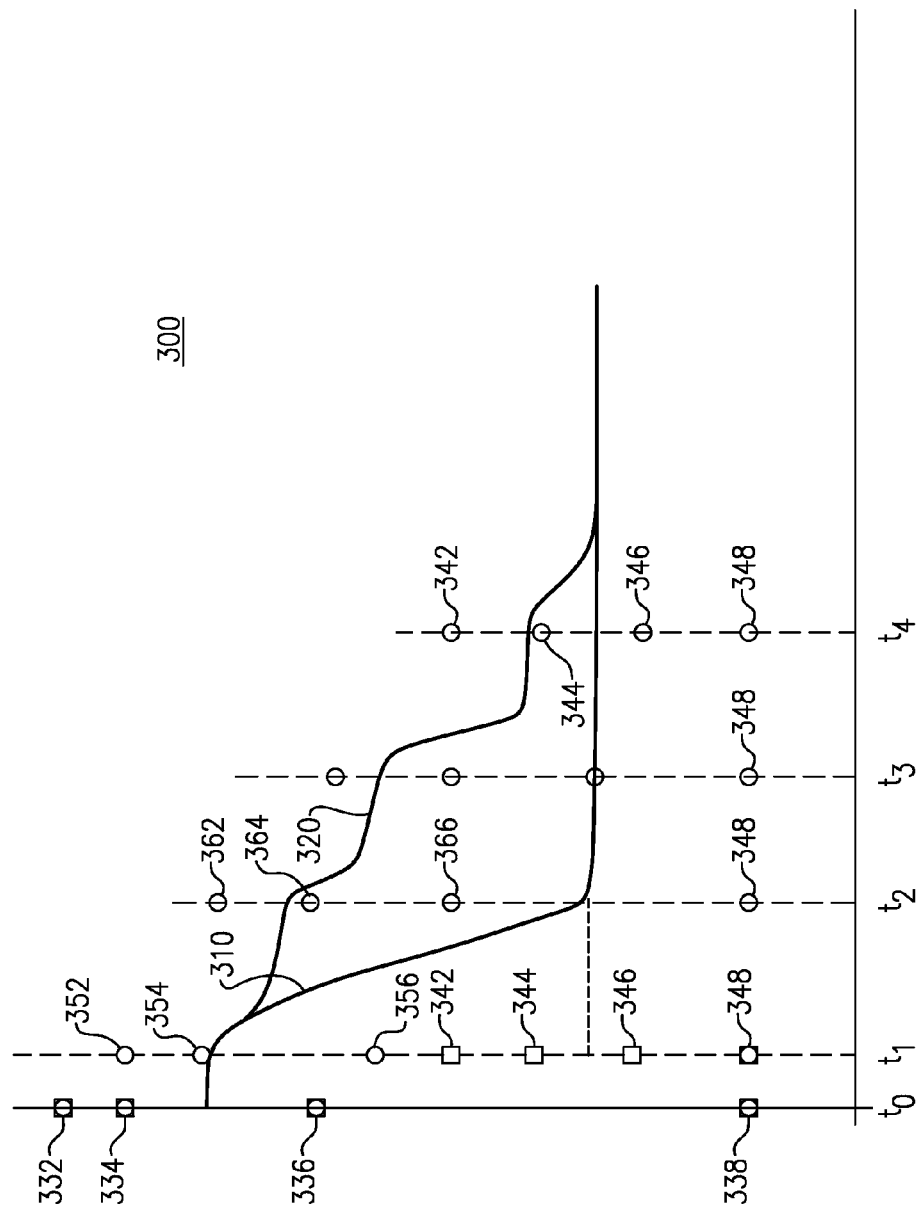
FIG. 4 illustrates a chart of a battery system state of charge over time when entering a storage mode.

With continued reference to FIGS. 1-3, FIG. 4 illustrates the incremental adjustment of the state of charge limits from the first value to a final end value. FIG. 4 includes a chart 300 including a line 310 indicating a state of charge level for a system with a near instantaneous drop from the operating state of charge levels to the storage state of charge levels and a line 320 indicating the above described incremental adjustment from the operating state of charge levels to the storage state of charge levels.

At time $t_0$, the vehicle 12 is being operated and no storage mode has been set by the vehicle 12 operator. At time $t_0$, a maximum state of charge limit 332, a high state of charge limit 334, a low state of charge limit 336 and a minimum state of charge limit 338 are defined by the battery system controller 52.

At time $t_1$, the operator places the vehicle 12 in storage mode. In the instantaneous adjustment systems (line 310), the battery system controller 52 adjusts the state of charge maximum limit 342, the state of charge high limit 344, and the state of charge low limit 346 to a storage level. As described above, the state of charge minimum limit is not adjusted in order to ensure that sufficient state of charge is maintained in the battery system 50 to restart the vehicle 12 upon exiting the storage mode. The near instantaneous adjustment of the state of charge limits 342, 344, 346 results in a sudden, sharp, change in power limits, and consequently a sudden, sharp drop in the state of charge of the battery system 50.

To reduce this sudden drop in the state of charge, the example battery system controller 52 reduces the state of charge limits incrementally over a period of time as shown with line 320. At $t_1$, the battery system receives the initial storage mode input and reduces the state of charge maximum limit 332, the state of charge high limit 334, and the state of charge low limit 336 to intermediate values 352, 354, 356 that are lower than the initial operating values. At time $t_2$, the battery system controller 52 again decreases the state of charge limits 352, 354, 356 to new lower state of charge limits 362, 364, 366. This incremental process is repeated again at time $t_3$, and a final time at time $t_4$. At time $t_4$, the battery system controller 52 has adjusted the state of charge limits to be the final storage state of charge limits 342, 344, 346. Throughout this process, the minimum state of charge limit 348 is maintained constant.

The incremental adjustment of the state of charge limits illustrated in line 320 decreases the sharpness by which the state of charge levels of the battery system 50 are decreased while the operator is still operating the vehicle 12.

With reference again to FIG. 1, the vehicle 12 operator input can be more detailed than a single button push or toggle. In some examples, the operator can provide detailed information with regards to the duration of the extended storage by entering a value indicative of a time period during which the vehicle will be in extended storage. In some example vehicles, such as a plug-in hybrid or BEV vehicle, the process described in FIG. 3 can include an additional step of returning the battery control parameters to non-extended storage levels in response to the user defined extended storage duration expiring. In this example, the vehicle 12 resets the battery control parameters and begins charging the vehicle 12 using the plugged in power source once the duration has extended. In this example, the battery can be charged up to its maximum charge limit in non-storage mode. This charging enables full use of the vehicle 12 immediately upon the return of the operator. As the vehicle will not be operated during the extended storage, it is not necessary to gradually increase the battery control parameters as the battery system controller 52 exits the extended storage mode.

In yet another alternate example system, the battery system controller 52 or the general engine controller 60 can include network capabilities, such as wireless and/or cellular wireless communications. In this example, if the operator has left the vehicle and later determines that the vehicle 12 will not be needed for an extended time, the operator can remotely place the vehicle 12 in extended storage mode using a network connected device, such as a computer or smartphone. Once the vehicle receives the remote "Enter Storage Mode" command, the battery system controller 52 places the battery system 50 in storage mode as described above.

In a further example vehicle 12 including the network connectivity feature, the operator can set the extended storage mode during operation of the vehicle 12 and indicate an unspecified duration of the extended storage. The operator can then use a network connected device, such as a computer or smartphone, to turn off the extended storage mode remotely, before the vehicle 12 is needed again. In this example, if the vehicle 12 is a plug-in or BEV type vehicle, the battery system 50 can begin charging up to the non-storage state of charge parameters as soon as the exit storage mode input is received, and the vehicle can be in standard mode by the time the operator is ready to use the vehicle 12.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for extending a life cycle of a battery comprising: receiving a storage mode status signal at a battery system controller, the storage mode status signal including an expected duration of a storage mode;
and incrementally adjusting a state of charge window over a predefined time period in response to receiving the storage mode status signal by gradually adjusting a state of charge low limit from a first state of charge low limit value to a second state of charge low limit value by periodically decrementing the state of charge low limit value by a set amount over a predefined period of time,
gradually adjustig a state of charge high limit from a first state of charge high limit value to a second state of charge high limit value by periodically decrementing the state of charge high limit value by a set amount over a predefined period of time,
and gradually adjusting a state of charge maximum limit from a first state of charge maximum limit value to a second state of charge maximum limit value periodically decrementing the state of charge maximum limit value by a set amount over a predefined time period;
and maintaining a state of charge minimum limit in response to the storage mode status signal.

2. The method of claim 1, wherein the state of charge window is defined by the state of charge high limit and the state of charge low limit, the state of charge high limit being less than the state of charge maximum limit and the state of charge low limit being greater than the state of charge minimum limit.

3. The method of claim 2, further comprising operating vehicle electronic systems using power from the battery, thereby reducing a charge level of the battery until the battery is within the state of charge window defined between the state of charge low limit value and the state of charge high limit value.

4. The method of claim 1, further comprising outputting a signal indicative of the battery system controller fully entering a storage mode in response to the state of charge low limit value reaching a storage state of charge low limit value and the state of charge high limit value reaching a storage state of charge high limit value, and battery state of charge (or charge level) is within the storage state of charge low limit and the storage state of charge high limit.

5. The method of claim 1, further comprising:
the battery system controller periodically polling a driver input.

6. The method of claim 5, wherein receiving the storage mode status signal at the battery system controller, incrementally adjusting the state of charge window over the predefined time period in response to receiving the storage mode status signal are performed during operation of a vehicle containing the battery.

7. The method of claim 1, further comprising resetting the state of charge low limit to a non-storage low limit value, resetting the state of charge high limit to a non-storage high limit value, and resetting the state of charge maximum limit to a non-storage maximum limit value in response to a duration of the storage mode being exceeded.

8. The method of claim 7, further comprising charging a battery system in response to the duration of the storage mode being exceeded.

9. The method of claim 1, further comprising reducing a charge power limit of the battery system and adjusting a discharge power limit of the battery system to a predefined value after incrementally adjusting the state of charge window over the predefined time period in response to receiving the storage mode status signal.

10. The method of claim 1, further comprising exiting a storage mode in response to receiving a remote signal.

11. The method of claim 1, wherein the battery is a lithium-ion battery.

12. A vehicle battery system controller comprising:
a non-transitory computer readable medium storing instructions operable to cause a battery system controller to incrementally adjust a state of charge window over a predefined time period in response to receiving a storage mode status signal by gradually adjusting a state of charge low limit from a first state of charge low limit value to a second state of charge low limit value by periodically decrementing the state of charge low limit value by a set amount over a predefined period of time, gradually adjusting a state of charge high limit from a first state of charge high limit value to a second state of charge high limit value by periodically decrementing the state of charge high limit value by a set amount over a predefined period of time, and gradually adjusting a state of charge maximum limit from a first state of charge maximum limit value to a second state of charge maximum limit value periodically decrementing the state of charge maximum limit value by a set amount over a predefined time period; and
further operable to maintain a state of charge minimum limit, in response to a storage mode status signal; and
an operator input having at least one of a touch screen button, a physical button, a toggle, and a remote input connection, the operator input including a duration input operable to receive a duration of a storage mode.

13. The vehicle battery system controller of claim 12, further comprising a remote input.

14. The vehicle battery system controller of claim 13, wherein the remote input is a wireless receiver.

15. The vehicle battery system controller of claim 12, wherein the state of charge window is defined by the state of charge high limit and the state of charge low limit, the state of charge high limit being less than the state of charge maximum limit, and the state of charge low limit being greater than the state of charge minimum limit.

16. A method for operating an electrified vehicle:
receiving a storage mode status signal from a vehicle operator at a battery energy control module; and
gradually adjusting a state of charge low limit from a first state of charge low limit value to a second state of charge low limit value by periodically decrementing the state of charge low limit value by a set amount over a predefined period of time, gradually adjusting a state of charge high limit from a first state of charge high limit value to a second state of charge high limit value by periodically decrementing the state of charge high limit value by a set amount over a predefined period of time, and gradually adjusting a state of charge maximum limit from a first state of charge maximum limit value to a second state of charge maximum limit value periodically decrementing the state of charge maximum limit value by a set amount over a predefined time period.

* * * * *